Sept. 3, 1968   C. A. GRENCI   3,400,074
CENTRIFUGAL REVERSE OSMOSIS FOR DESALINATION
Filed Sept. 15, 1965   2 Sheets-Sheet 1

INVENTOR.
CARL A. GRENCI
BY Bruce A Jagge
ATTORNEY

Sept. 3, 1968         C. A. GRENCI         3,400,074

CENTRIFUGAL REVERSE OSMOSIS FOR DESALINATION

Filed Sept. 15, 1965         2 Sheets-Sheet 2

INVENTOR
CARL A. GRENCI
BY
ATTORNEY

United States Patent Office 3,400,074
Patented Sept. 3, 1968

3,400,074
CENTRIFUGAL REVERSE OSMOSIS FOR DESALINATION
Carl A. Grenci, 4791 Lesa Place,
Yorba Linda, Calif. 92686
Filed Sept. 15, 1965, Ser. No. 487,531
19 Claims. (Cl. 210—23)

ABSTRACT OF THE DISCLOSURE

An apparatus and process for desalination wherein salt water is introduced inside a rotating cylindrical semi-permeable membrane so that pure water passes through the membrane under centrifugal force.

---

This invention relates to the pressure induced separation of multi-component admixtures using semi-permeable separators or membranes. More particularly, this invention relates to a process and an apparatus for providing the requisite pressure to accomplish the separation of at least one of the components from a multi-component admixture using a semi-permeable separator or membrane.

Many processes, in which a separation of components from one another is accomplished through the use of a semi-permeable membrane, are accelerated or made possible by the application of pressure to the multi-component admixture. One such process is reverse osmosis.

Reverse osmosis consists of elevating the pressure of a solvent-solute admixture to above its osmotic pressure and bringing it into contact with a membrane which is permeable to the solvent, but not to the solute. Some solvent passes through the membrane leaving a concentrated solvent-solute admixture behind.

The technique of reverse osmosis has attracted considerable attention as a potential water desalinization technique because it does not involve any phase changes of the saline water. Most of the energy consumed by a reverse osmosis operation is consumed in bringing the solvent-solute admixture to a pressure above the osmotic pressure of this admixture. Previously, considerable difficulty had been experienced in achieving the requisite high pressure in an economical manner. In general, previous reverse osmosis techniques had also experienced difficulty in providing equipment which would be capable of handling large volumes of solvent-solute admixture economically at the requisite high pressures.

These and other disadvantages of the prior art have been overcome by the present invention.

It is an object of this invention to economically elevate the pressure of a multi-component admixture which is in contact with a semi-permeable membrane, which membrane permits the passage therethrough of less than all, but at least one, of the components in said admixture to facilitate said passage through said membrane.

It is an object of this invention to economically elevate the pressure of a solvent-solute admixture to accomplish reverse osmosis.

It is a further object of this invention to provide means for elevating the pressure of a solute containing fluid to a pressure above its osmotic pressure without employing high pressure pumps, lines and fittings.

Another object of this invention is the elevation of a solvent-solute admixture to a pressure above its osmotic pressure by applying centrifugal force to said admixture.

Further objects and advantages will become apparent from a reading of the following specification, examination of the accompanying figures, and practicing this invention.

Broadly, this invention comprises the application of centrifugal force to a multi-component admixture to elevate the pressure of said admixture. The admixture is brought into contact with a semi-permeable membrane to facilitate the separation of the components in said admixture. When this invention is employed to accomplish reverse osmosis, centrifugal force is used to elevate a solvent-solute admixture to a pressure above its osmotic pressure.

When this invention is applied to a reverse osmosis operation, an osmotic membrane which is substantially impermeable to the solute or solutes which are contained in the solvent-solute admixture is so positioned that centrifugal force acting upon the admixture drives at least a part of the solvent through the osmotic membrane. Conveniently, the osmotic membrane is provided at an outer rotatable wall of a centrifugal device. The solvent-solute admixture is supplied to the inner surface of the membrane, and the substantially pure solvent which passes through the membrane is collected at the outer side thereof. In general, the volume of solvent-solute admixture supplied to the inner surface of the membrane is several times in excess of that volume of solvent which passes through the membrane. The excess enriched solvent-solute admixture is withdrawn from the inward face of the osmotic membrane by appropriate means.

Advantageously, the apparatus of this invention may be so designed that once primed with admixture it will pump its own supply of admixture as well as discharging a waste stream. This auto-pumping characteristic also accomplishes a thorough, continuous flushing of the membrane or separator surface so that stagnant areas do not occur at any point on the membrane or separator surface. The elimination of stagnant areas on the surface of the membrane is particularly important in a reverse osmosis operation. Stagnant areas tend to become so concentrated in solute that the amount of pressure required to accomplish reverse osmosis is prohibitive.

Further purification of the component or components which pass through the semi-permeable membrane may be accomplished by providing a plurality of membranes in one centrifugal device, or a plurality of such devices may be provided in series.

The operation of this invention is readily automated, thus permitting continuous operation with only periodic routine maintenance. This operation also admits of intermittent or remote control operation.

Generally, some means is provided for filtering the fluids prior to introducing them into the centrifugal devices of this invention.

For a more detailed understanding of this invention, reference is made to the accompanying drawings in which.

Figure 1:
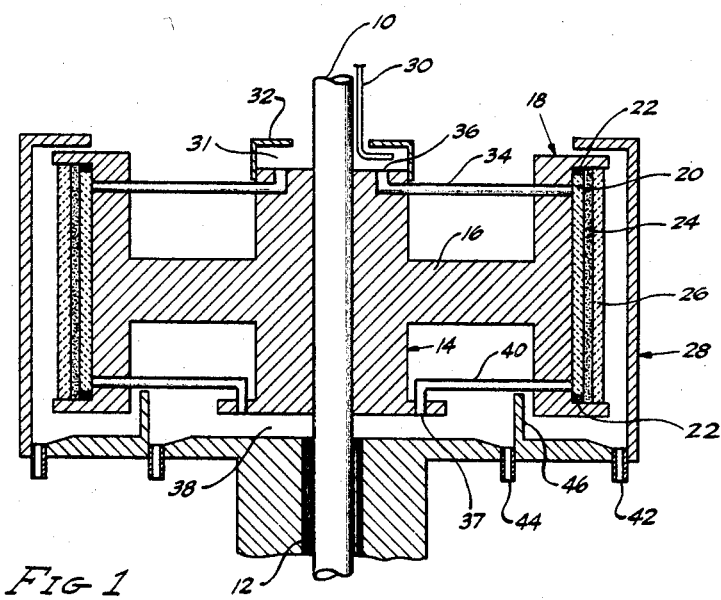
FIGURE 1 is a cross-sectional view of a portion of a centrifugal device of this invention.

Referring particularly to FIGURE 1, the portion of the centrifugal device shown in cross-section is composed of a shaft 10 rotatably journaled in bearing 12. The shaft carries affixed thereto a hub indicated generally at 14 which hub is connected by web 16 to a rim indicated generally at 18. Rim 18 carries at the outward end thereof a permeable distributor 20 having seals 22 at the ends thereof. Permeable distributor 20 abuts the inward side of semi-permeable membrane 24. The outward side of membrane 24 is supported by permeable retainer 26. The outward side of retainer 26 is spaced apart from a collector ring, indicated generally at 28. Collector ring 28 is stationary while shaft 10, hub 14 and rim 18 rotate together. Fluid source conduit 30 terminates in source collector 31 which is defined by baffle 32. Fluid source conduit 30 is stationary and baffle 32 rotates with hub 14. Fluid supply conduit 34 communicates with source collector 31 and terminates adjacent the inward surface of permeable distributor 20. Fluid return conduit 40 communicates with permeable distributor 20 and terminates in waste collector 38.

A sufficient number of fluid supply conduits 34 are spaced around the circumference of rim 18 so that a fresh supply of fluid is provided to substantially the entire inward surface of membrane 24. The continuous influx of fluid through fluid supply conduit 34 washes the inward face of membrane 24 clean of concentrated fluid. A sufficient number of fluid return conduits 40 are provided so that waste fluid can be withdrawn promptly from the inward face of membrane 24.

In operation, a solvent-solute admixture such as sea water or brackish water is supplied through fluid source conduit 30 to source collector 31. From source collector 31 a portion of the admixture is drawn by centrifugal force through fluid supply conduit 34 into contact with permeable distributor 20. The admixture passes through permeable distributor 20 and contacts the inward face of membrane 24. A portion of the solvent in the admixture passes on through membrane 24 and onto the inner face of permeable retainer 26. The solvent passes through permeable retainer 26 and into collector ring 28 from which it is withdrawn through solvent discharge 42. A solute enriched solvent-solute admixture is withdrawn from permeable distributor 20 through fluid return conduit 40. From fluid return conduit 40 this enriched admixture is discharged into waste collector 38. Waste admixture is withdrawn from waste collector 38 through waste discharge 44. Barrier 46 separates the waste in waste collector 38 and the solvent in collector ring 28. A suitable source of power, not shown, is applied to shaft 10 to rotate rim 18 at a peripheral velocity sufficient to achieve the desired pressure upon the solvent-solute admixture in contact with membrane 24.

Advantageously, the apparatus shown in FIGURE 1 is auto-pumping so long as inlet port 36 is spaced a shorter radial distance from the center line of shaft 10 than is outlet port 37. As outlet port 37 is moved radially outward with respect to inlet port 36 more and more power is required to drive shaft 10 and the fluid discharged at outlet port 37 contains a greater amount of energy. As outlet port 37 is moved radially closer to inlet port 36 the energy in the stream discharged at outlet port 37 decreases, and also the auto-pumping action decreases. Preferably, a rotating seal, not shown, is provided between fluid source conduit 30, which is stationary, and baffle 32, which rotates, so that source collector 31 may be filled with liquid to insure a uniform supply of fluid through fluid supply conduit 34. Also, when the outlet end of fluid source conduit 30 is continuously emersed in a body of liquid in source collector 31, the apparatus will draw its own feed supply through fluid source conduit 30.

Figure 2:
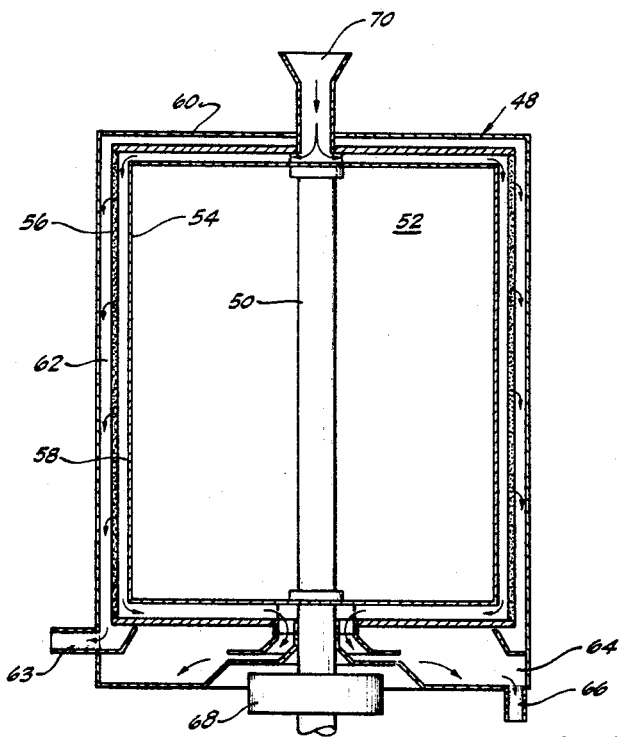
FIGURE 2 is a schematic cross-sectional view of an additional embodiment of this invention.

Referring particularly to FIGURE 2; in this embodiment the centrifugal device indicated generally at 48 is composed of three concentric cylinders, two of which are affixed to and rotate with shaft 50. The innermost cylinder indicated generally at 52 has as its outward circumference, inner wall 54. Concentric with and spaced slightly from inner wall 54 is semi-permeable wall 56. Between wall 56 and inner wall 54 is a passage 58. Semi-permeable wall 56 is composed of one or more membranes. These membranes are retained in place by some permeable retainer when they are not themselves sufficiently strong to withstand the centrifugal forces to which they are subjected. A suitable semi-permeable wall construction is that shown in FIGURE 1 which is composed of a semi-permeable membrane sandwiched between a permeable retainer and a permeable distributor. The permeable retainer supports the membrane against centrifugal force, and the permeable distributor protects the surface of the membrane so that it is not damaged by the surge of fluid to and fro across it. Semi-permeable wall 56 is generally concentric with and spaced slightly apart from housing 60. The generally annular space between housing 60 and the outer side of wall 56 acts as a solvent collector 62. The solvent in solvent collector 62 is discharged from the centrifugal device through solvent discharge 63. Waste collector 64 communicates with passage 58 and waste discharge 66 communicates with waste collector 64. Shaft 50 is rotatably journaled in bearing 68. Inlet conduit 70 communicates with passage 58.

In operation, a solvent-solute admixture is supplied through inlet conduit 70 to passage 58 while shaft 50 is rotating. The centrifugal force on the admixture will drive it against the inner surface of semi-permeable wall 56. Solvent which passes through the membrane in wall 56 is collected in solvent collector 62 and discharged through solvent discharge 63. A solute-enriched admixture passes through passage 58 into waste collector 64 and out of the centrifugal device through waste discharge 66. The action of the admixture passing through passage 58 flushes the surface of the semi-permeable membrane so that there is no collection of solute-rich material adjacent to the inner surface of wall 56. Advantageously, the admixture which is supplied to the centrifugal device through inlet conduit 70 need not be under pressure. Also, the solvent discharged through solvent discharge 63, and the waste admixture discharged through waste discharge 66, are under very low pressures. Any desired pressure on the admixture in contact with wall 56 may be achieved by appropriately adjusting the peripheral velocity of wall 56 and the diameter of the cylinder formed by wall 56. Pressures ranging from a few pounds per square inch to several thousands of pounds per square inch, say from 10 pounds per square inch to 10,000 pounds per square inch, may be readily achieved wtih this centrifugal device.

Figure 3:
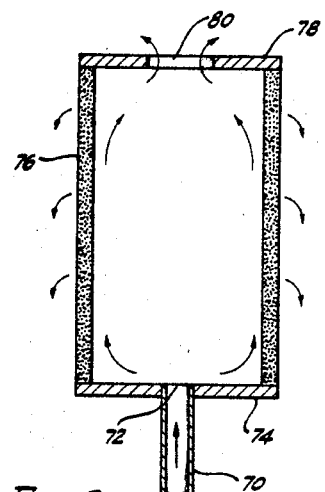
FIGURE 3 is a schematic cross-sectional view of a further embodiment of this invention.

Referring particularly to FIGURE 3; there is illustrated schematically a centrifugal device which enjoys the auto-pumping advantages of this invention. Fluid source conduit 70 communicates with inlet port 72 which is positioned in lower wall 74 concentrically with the longitudinal axis of this centrifugal device. A semi-permeable wall 76, which is in the general form of a cylinder, is positioned between lower wall 74 and upper wall 78. Outlet port 80 is concentric with and at least slightly larger than inlet port 72.

In the operation of the centrifugal device illustrated in FIGURE 3 fluid source conduit 70 is positioned in a suitable supply of multi-component admixture. The centrifugal device is rotated about its longitudinal axis and it is primed, for example, by pouring a quantity of the multi-component admixture into the interior of this device. Once primed, the device will continue to pump its own supply of admixture through fluid source conduit 70. The admixture which comes into the centrifugal device through inlet port 72 is driven outwardly by centrifugal force as shown by the arrows until it contacts semi-permeable wall 76. The admixture crawls up wall 76 until it contacts upper wall 78 whereupon it flows inwardly until it reaches the edge of outlet port 80. The admixture is discharged through outlet port 80 into a suitable collector, not shown. The component or components of the multi-component admixture which pass through semi-permeable wall 76 are collected at the outward side thereof by appropriate means, not shown. Advantageously, the auto-pumping characteristics of this device avoid the necessity of providing pumps to supply and withdraw the admixture. Also, the inner surface of semi-permeable wall 76 is continuously flushed so that no point on the inner surface of this wall has a stagnant area of admixture in contact with it. This auto-pumping characteristic is provided so long as outlet port 80 discharges admixture at a point radially further from the center line of the centrifugal device than the point at which the admixture is provided through inlet port 72. The velocity, and therefore the concentration of the admixture, is controlled by the relative positioning of the inlet and outlet ports. The velocity increases and the concentration decreases as the outlet port is moved radially outward relative to the inlet port.

The semi-permeable wall 76 may be composed of one or more layers of semi-permeable membranes, which membranes may have the same or different characteristics. The membranes in semi-permeable wall 76 may be supported, if necessary, by permeable supports, not shown. The membranes may be arranged in configurations which will give a greater surface area than would be provided by a flat, cylindrical sheet. For example, membranes may be arranged in a pleated or accordian like configuration. The membrane may also be made in a plurality of sections so that if one small area is damaged or rendered inoperative that section may be replaced without disturbing the remainder of the semi-permeable wall.

This centrifugal device may be used to separate a wide variety of multi-component admixtures, such as for example, saline water, organic admixtures, and the like.

Figure 4:
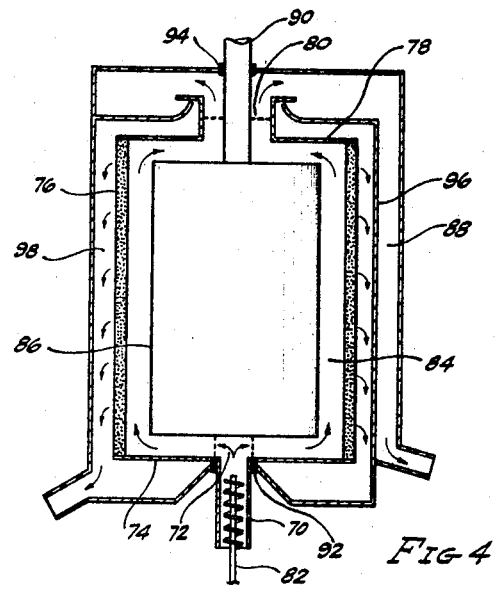
FIGURE 4 is a schematic cross-sectional view of an apparatus of this inventioin.

Referring particularly to FIGURE 4; there is illustrated schematically a centrifugal device of this invention which is particularly suited to the desalinization of water. Fluid source conduit 70 contains, in the lower portion thereof, inducer 82. Fluid source conduit 70 communicates with inlet port 72. A first annular passage 84 is defined between inner wall 86 and semi-permeable wall 76. First annular passage 84 communicates with outlet-port 80. Outlet port 80 empties into waste collector 88. Shaft 90 is rotatably driven by a suitable power source, not shown. Shaft 90 is connected to inner wall 86 and semi-permeable wall 76 so that these walls rotate with shaft 90. A rotating seal 92 is provided between lower wall 74 and the end of fluid source conduit 70. A second rotating seal 94 is provided between shaft 90 and the outward wall of waste collector 88. The space between semi-permeable wall 76 and stationary outer wall 96 defines product collector 98.

In operation, the contrifugal device illustrated schematically in FIGURE 4 is conveniently supported over a source of saline water so that inducer 82 is immersed below the surface of that source of saline water. In order to place this centrifugal device in operation shaft 90 is rotated at the desired speed and inducer 82 is started so as to drive saline water through inlet port 72. If desired, inducer 82 may be attached to shaft 90 and rotated continuously therewith. Inducer 82 is used to prime this centrifugal device. Once a substantial amount of saline water has been charged through inlet port 72 the device acts as its own pump. As soon as auto-pumping begins inducer 82 may be shut off or withdrawn, if desired. Inner wall 86, which is slightly smaller than and concentric with semi-permeable wall 76, serves to reduce the quantity of saline water which is being rotated in this device at any given point in time. The spacing between walls 76 and 86 also controls the velocity in that a narrower spacing tends to increase the velocity of the admixture past wall 76. The presence of inner wall 86 also serves to distribute the water uniformly over the inward surface of semi-permeable wall 76 so that no channeling of the admixture takes place. That component which passes through semi-permeable wall 76 flows downwardly between the outer surface of semi-permeable wall 76 and the inner surface of stationary outer wall 96 through product collector 98. This component, which is generally the product of this process, is then discharged from the system to some appropriate collection manifold, not shown. The waste multi-component admixture flows out through outlet port 80 and is discharged into waste collector 88 for disposal through some appropriate waste collection manifold, not shown. In some instances the waste may pass through semi-permeable wall 76 and the desired product is collected in waste collector 88.

Figure 5:
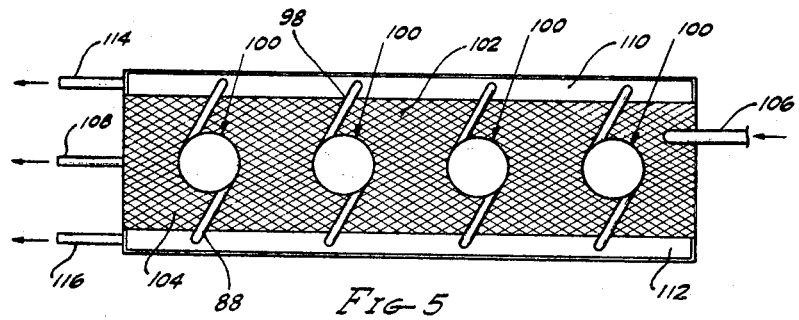
FIGURE 5 is a plan view of a desalinization plant using the apparatus of this invention.
Figure 6:
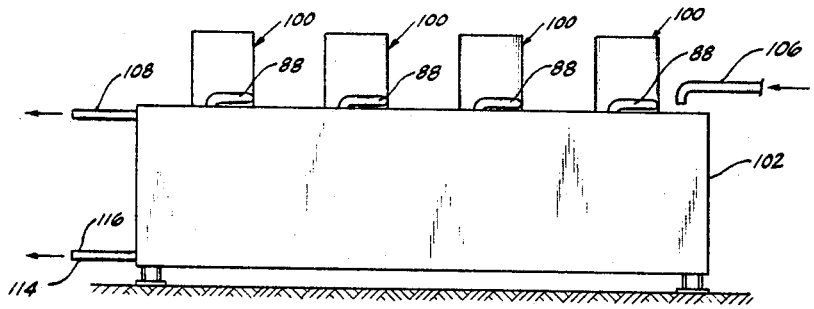
FIGURE 6 is a front elevation of the plant shown in FIGURE 5.

Referring particularly to FIGURES 5 and 6; a plant is illustrated schematically in which centrifugal devices, such as that shown in FIGURE 4, are shown in operative, producing position. This plant can be used, for example, in the desalinization of sea water. Centrifugal devices 100 are supported in operatative position over feed reservoir 102 by support floor 104. Raw materials are supplied to feed reservoir 102 through supply conduit 106. An overflow conduit 108 is provided at the top of feed reservoir 102 to insure that the liquid level does not rise too high in feed reservoir 102. Arranged on either side of feed reservoir 102 are product manifold 110 and waste manifold 112. Product conduit 114 conducts product away from product manifold 110 to some appropriate storage area, not shown. Waste conduit 116 conducts waste material away from waste manifold 112 to some appropriate disposal location, not shown. Product manifold 110 is fed by product collector 98 and waste manifold 112 is fed by waste collector 88. The product collector 98 and waste collector 88 are shown in detail in FIGURE 4.

The semi-permeable membranes used in this invention are impermeable to one or more of the components in a multi-component admixture. Osmotic membranes used in this invention are permeable to water and impermeable to dissolved salts, and include, for example, synthetic resinous ion exchange materials incorporated into sheet form, cellulose acetate, animal membranes, microporous polymeric film, and the like. The osmotic membrane possesses the property of excluding mineral molecules while permitting the passage of water molecules.

Suitable permeable materials which may be used as permeable distributors or permeable retainers include, for example, sintered metal, ceramics, high strength carbon, porous reinforced plastic materials, and the like. Generally, these permeable materials are rigid, however, they may be flexible if desired. Flexible permeable materials are supported generally on some non-porous rigid support member.

As will be understood by those skilled in the art, what has been described are preferred embodiments of this invention in which many modifications and changes may be made without departing from the spirit and scope of the following claims.

What is claimed is:
1. A process of separating at least one component from a multi-component admixture which comprises:
   applying centrifugal force to said admixture; and
   flowing said admixture, while said force is being applied thereto, over a semi-permeable membrane to effect passage of said at least one component through said membrane to separate said at least one component from said admixture.
2. A process for separating at least one component from a multi-component admixture which comprises:
   applying centrifugal force to said admixture while contacting said admixture with a semi-permeable membrane to cause at least one of said components to separate from said admixture and pass through said membrane leaving a residual admixture in contact with said membrane;
   supplying a flowing stream of said multi-component admixture at a location radially inward of said membrane; and
   withdrawing said residual admixture at a location radially intermediate to said membrane and the location at which said multi-component admixture is supplied.
3. In the process of pressure induced reverse osmosis, applying centrifugal force to a solute containing admixture to produce said pressure and directing said force against a semi-permeable membrane to effect said reverse osmosis.

4. In the process of separating solvent-solute containing admixture by reverse osmosis;
applying pressure to said admixture to accomplish said reverse osmosis, said pressure being produced by centrifugal force acting on said admixture and forcing said admixture against a surface of an osmotic membrane.

5. The process comprising:
subjecting a solute containing liquid admixture to centrifugal force;
providing a substantially cylindrical wall member at least a portion of which comprises a semi-permeable membrane, said member surrounding said liquid admixture;
presenting said admixture, while said force is being applied thereto, to one side of said semi-permeable membrane whereby solute-free liquid is forced to pass through said membrane; and
collecting said solute-free liquid after it has passed through said membrane.

6. The process of claim 5 wherein said solute containing admixture is at substantially ambient pressure prior to being subjected to said centrifugal force.

7. The process of claim 5 wherein said solute-free liquid is collected at substantially ambient pressures.

8. The process of claim 5 wherein the residual admixture remaining after said solute-free liquid is separated therefrom is collected at substantially ambient pressure.

9. Apparatus for extracting at least one component from a multi-component admixture which comprises:
means for applying centrifugal force to said admixture;
a semi-permeable membrane disposed substantially at right angles to the direction of said centrifugal force;
means for contacting said admixture, while said force is being applied thereto, with said membrane; and
means for collecting a component which passes through said membrane.

10. The apparatus of claim 9 including means for filtering said admixture prior to applying centrifugal force to said admixture.

11. A centrifugal device comprising:
a continuous wall rotatably mounted;
said wall comprising a semi-permeable membrane;
means for supplying a continuous stream of a multi-component admixture to the inward side of said membrane; and
means for withdrawing a component which passes through said membrane from the outward side of said membrane.

12. A centrifugal device comprising:
a continuous wall rotatably mounted;
said wall comprising a semi-permeable membrane;
means for supplying a multi-component admixture to the inward side of said membrane; and
means for withdrawing said admixture from the inward side of said membrane, said means for supplying said admixture comprising an inlet positioned radially inward of said wall, and said means for withdrawing said admixture comprising an outlet positioned radially intermediate of said wall and said inlet.

13. A centrifugal device comprising:
a generally cylindrical wall rotatably mounted;
said wall comprising a semi-permeable membrane;
an inlet for supplying a multi-component admixture to the inward side of said membrane at one end of said cylindrical wall;
an outlet for withdrawing said admixture from the inward side of said membrane at the other end of said cylindrical wall, said inlet being positioned closer to the longitudinal axis about which said cylindrical wall is rotatably mounted than said outlet.

14. A centrifugal device comprising:
a rotatably mounted wheel;
a rim on said wheel, said rim having;
an outer retainer;
a semi-permeable membrane adjacent the inward side of said retainer;
means for supplying a fluid solvent-solute admixture to the inward side of said membrane;
means for withdrawing a solute enriched admixture from said inward side of said membrane; and
means for withdrawing solvent from the outward side of said membrane.

15. A centrifugal device comprising:
a rotatably mounted inner wall;
a semi-permeable wall rotatably and concentrically mounted with said inner wall, said semi-permeable wall being spaced apart from said inner wall to provide a passageway therebetween;
means for supplying a solvent-solute admixture to said passage between said inner wall and said semi-permeable wall;
means for withdrawing said solvent-solute admixture from said passage; and
means for collecting solvent from the outward side of said semi-permeable wall.

16. The centrifugal device of claim 15 wherein said semi-permeable wall comprises an osmotic membrane supported by a permeable retainer.

17. The centrifugal device of claim 15 wherein said means for supplying is an inlet positioned radially inwardly of said inner wall and said means for withdrawing is an outlet positioned radially intermediate said means for supplying and said inner wall.

18. The process comprising:
providing a substantially cylindrical wall;
providing a semi-permeable membrane substantially concentric with said wall and inwardly spaced therefrom;
providing a solute containing liquid admixture within said cylindrical wall;
subjecting said admixture to centrifugal force so that said admixture is driven into contact with the inner surface of said semi-permeable membrane whereby solute-free liquid is forced to pass through said membrane; and
collecting said solute-free liquid after it has passed through said membrane.

19. A centrifugal device comprising:
a continuous cylindrical wall;
a continuous semi-permeable membrane rotatably mounted concentrically with said wall and radially inwardly of said wall;
means for supplying a multicomponent admixture to the inward side of said membrane; and
means for withdrawing said admixture from the inward side of said membrane; said means for supplying said admixture comprising an inlet positioned radially inward of said wall and said means for withdrawing said admixture comprising an outlet positioned radially intermediate of said wall and said inlet.

References Cited

UNITED STATES PATENTS

| | | | |
|---|---|---|---|
| 2,985,587 | 5/1961 | Hoch et al. | 210—22 |
| 3,236,768 | 2/1966 | Litt | 210—23 |

OTHER REFERENCES

Ellis: Fresh Water From the Ocean, pages 75–76 relied upon, copyright 1954, The Conservation Foundation, Inc.

REUBEN FRIEDMAN, *Primary Examiner.*

F. SPEAR, *Assistant Examiner.*